United States Patent [19]
Nguyen

[11] Patent Number: 5,905,954
[45] Date of Patent: May 18, 1999

[54] METHOD AND SYSTEM FOR TRANSFERRING SUBSCRIBER INFORMATION IN A RADIO TELECOMMUNICATIONS NETWORK

[75] Inventor: Viet Anh Nguyen, Montreal, Canada

[73] Assignee: Telefonaktiebolaget LM Ericsson (publ), Stockholm, Sweden

[21] Appl. No.: 08/783,222

[22] Filed: Jan. 14, 1997

[51] Int. Cl.⁶ .................................................... H04B 1/00
[52] U.S. Cl. ...................... 455/433; 455/414; 455/560; 455/445
[58] Field of Search ................................ 455/413, 433, 455/560, 445, 422

[56] References Cited

U.S. PATENT DOCUMENTS

| | | | |
|---|---|---|---|
| 5,212,727 | 5/1993 | Ramkumar | 379/221 |
| 5,278,890 | 1/1994 | Beeson, Jr. et al. | 379/57 |
| 5,289,179 | 2/1994 | Beeson, Jr. et al. | 340/826 |
| 5,319,699 | 6/1994 | Kerihuel et al. | 379/58 |
| 5,345,502 | 9/1994 | Rothenhöfer | 379/207 |
| 5,379,383 | 1/1995 | Yunoki | 395/325 |
| 5,440,541 | 8/1995 | Iida et al. | 370/60.1 |

FOREIGN PATENT DOCUMENTS

| | | |
|---|---|---|
| 0 630 165 A3 | 4/1994 | European Pat. Off. . |
| 0 682 457 A2 | 5/1995 | European Pat. Off. . |
| WO 94/10813 | 5/1994 | WIPO . |
| WO 94/23506 | 10/1994 | WIPO . |
| WO 95/01075 | 1/1995 | WIPO . |
| WO 95/01602 | 1/1995 | WIPO . |
| WO 95/11578 | 4/1995 | WIPO . |
| WO 95/20299 | 7/1995 | WIPO . |
| WO 95/26114 | 9/1995 | WIPO . |
| WO 95/28812 | 10/1995 | WIPO . |
| WO 97/27713 | 7/1997 | WIPO ............... H04Q 7/24 |

*Primary Examiner*—Thanh Cong Le
*Assistant Examiner*—Makoto Aoki
*Attorney, Agent, or Firm*—Steven W. Smith

[57] ABSTRACT

A method and system for transferring subscriber information required for implementing an intelligent network (IN) service in a radio telecommunications network. The method begins by a G-MSC sending a signaling message requesting a location of the subscriber to a HLR. The HLR then recognizes that the subscriber has requested an IN service. Next, the HLR sends an indication that the subscriber has the requested IN service to the G-MSC. The next step includes sending a signaling message from the G-MSC to a service control point (SCP) identifying the IN service requested. Subsequently, the SCP requests from the HLR the subscriber information required for implementing the requested IN service. The HLR then sends a data message containing the requested subscriber information to the SCP. If the HLR does not have the requested information, but the information is available in a visited mobile switching center (V-MSC) where the subscriber is operating, the HLR requests and obtains the information from the V-MSC, and then forwards the information to the SCP.

17 Claims, 7 Drawing Sheets

METHOD AND SYSTEM FOR TRANSFERRING SUBSCRIBER INFORMATION IN A RADIO TELECOMMUNICATIONS NETWORK

BACKGROUND OF THE INVENTION

1. Technical Field of the Invention

This invention relates to radio telecommunication systems and, more particularly, to a method and system for transferring subscriber information for wireless Intelligent Network services in a radio telecommunications network.

2. Description of Related Art

In existing radio telecommunication networks, there exists an increased demand for advanced services Intelligent Network (IN) services have recently become available to a mobile subscriber to meet this demand. However, with the introduction of IN services, several problems have arisen in overlaying these IN services into the radio telecommunications network. A Service Control Point (SCP), which is a new logical node necessary to support IN services, has been developed. In order for the SCP to provide support for the telecommunications network, the SCP requires subscriber information (e.g. subscriber profile) from a Home Location Register (HLR)

In existing systems, messages are sent using modified IS-41 Intersystem Signaling messages through the various nodes in order to provide the necessary subscriber information to the SCP. The existing system sends subscriber information from the HLR to a Gateway Mobile Switching Center (G-MSC). Subsequently, the G-MSC sends the subscriber information to the SCP.

There are several disadvantages, however, in the existing system and method of supplying subscriber information to the SCP. First, all three nodes (the HLR, the SCP, and the G-MSC), must be modified to support the additional subscriber information in messages sent between these nodes. In addition, the messages carrying the subscriber information must all be modified to carry this additional subscriber information. The subscriber information must also be added to a TERMREQ message used to pass the subscriber information to the SCP. Therefore, implementing the existing system has a large impact on the radio telecommunications network. Additionally, the existing system does not allow for future upgrades of IN services, without implementing several modifications to the radio telecommunication system, and therefore lacks flexibility and growth potential.

Although there are no known prior art teachings of a solution to the aforementioned deficiency and shortcoming such as that disclosed herein, prior art references that discuss subject matter that bears some relation to matters discussed herein are International Publication Number WO 95/26114 (Publication '114), European Patent Number 0630165 (Patent '165), and International Publication Number WO 95/20299 (Publication '299). Publication '114 discloses an intelligent mobile telecommunications network arrangement providing IN services. The network provides for a means for communicating between a Mobile Network and an Intelligent Network. The network comprises separate protocols for communication between the logical nodes of the Mobile telecommunications network and the logical nodes of the Intelligent Network.

However, Publication '114 does not disclose a system or method for transferring subscriber information directly from a HLR to a SCP. Additionally, Publication '114 does not disclose the messages needed to support the direct transfer of subscriber information between a HLR and a SCP.

Patent '165 discloses a mobile radio network in which toll charges are deducted from a credit account. Additionally, Patent '165 discloses a separate intelligent network system with a service exchange point (SSP) and a SCP. The network allows for switching and toll charging using simple protocols without changing the conventional network protocol (Mobile Application Part). However, Patent '165 does not disclose any means for communicating directly between the SCP and the ULR. Additionally, Patent '165 does not disclose the use or transfer of subscriber information from the HLR directly to the SCP.

Publication '299 discloses a cellular mobile communications network providing individual subscriber services. Additionally, Publication '299 provides a HLR to make routing decisions pertaining to supplementary services. The routing decisions made by the HLR are sent to a MSC for implementing the action dictated by the HLR. Publication '299 does not disclose the use of any new logical node, such as a SCP. In addition, Publication '299 fails to disclose any direct communication between the HLR and a node of the Intelligent Network. Rather, Publication '299 allows only for communication between the MSC and the HLR.

It would be a distinct advantage to have a system and method for transferring subscriber information from a HLR to a SCP, while reducing the impact on the radio telecommunications network. It would also be advantageous for such a system to have increased flexibility and growth potential. It is an object of the present invention to provide such a system and method.

SUMMARY OF THE INVENTION

In one aspect, the present invention is a method of conveying required information about a subscriber for implementing a requested Intelligent Network (IN) service in a radio telecommunications network having a Gateway Mobile Switching Center (G-MSC), a Service Control Point (SCP), and a Home Location Register (HLR). When the G-MSC receives a call that requires an IN service, the G-MSC sends a first signaling message requesting a location of the subscriber to the HLR. Next, the HLR recognizes that the subscriber has the IN service. Then, the HLR communicates an indication that the subscriber has the requested IN service to the G-MSC. The HLR may, in addition, communicate the location of the subscriber to the G-MSC. The method continues by the G-MSC sending a second signaling message to the SCP informing the SCP of the requested IN service. Next, the SCP transmits a data request message to the HLR requesting the required subscriber information. The SCP then transmits a data request message requesting the required subscriber information to the HLR. Finally, the HLR sends a data message containing the required subscriber information to the SCP.

In an alternate embodiment of the present invention, the present invention is a method of conveying required information about a subscriber for implementing a requested TN service in a radio telecommunications network having a G-MSC, a SCP, a HLR, and a Visited MSC (V-MSC) in which the subscriber is operating. The method begins by the G-MSC sending a first signaling message requesting a location of the subscriber to the EHLR. Next, the HLR recognizes that the subscriber has the IN service. Then, the HLR communicates an indication that the subscriber has the requested IN service to the G-MSC. The BLR may, in addition, communicate the location of the subscriber to the G-MSC. The method continues by the G-MSC sending a second signaling message to the SCP informing the SCP of the requested IN service. Next, the SCP transmits a first data request message to the HLR requesting the required subscriber information. Next, the method continues with determining whether the requested subscriber information is available in the HLR. Subsequently, upon determining that the requested subscriber information is not available in the HLR, the method proceeds with determining whether the subscriber's location is known (i.e., in which V-MSC the subscriber is operating). Next, upon determining that the subscriber's location (V-MSC) is known, the HLR sends a second data request message requesting the required subscriber information to the V-MSC. Then, the V-MSC determines whether the requested subscriber information is available in the V-MSC. Next, upon determining that the requested subscriber information is available in the V-MSC, the V-MSC then transmits a first data message containing the required subscriber information to the HLR. Finally, the HLR sends a second data message containing the required subscriber information to the SCP.

In another aspect, the present invention is a system that obtains and utilizes subscriber information stored in a HLR to implement a requested IN service. The system comprises a G-MSC for receiving an incoming call requesting an IN service for a subscriber. Additionally, the system also includes a SCP for implementing the requested IN service. The SCP includes means for identifying the subscriber information stored in the HLR required to implement the requested IN service. The system also includes means for notifying the SCP of the requested IN service and means for sending a request for the required subscriber information from the SCP to the HLR. Finally, the system includes means for sending the requested required subscriber information from the HLR to the SCP in response to a request from the SCP.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

The present invention is a method and system for transferring subscriber information for wireless Intelligent Network services in a radio telecommunications network.

Figure 1:
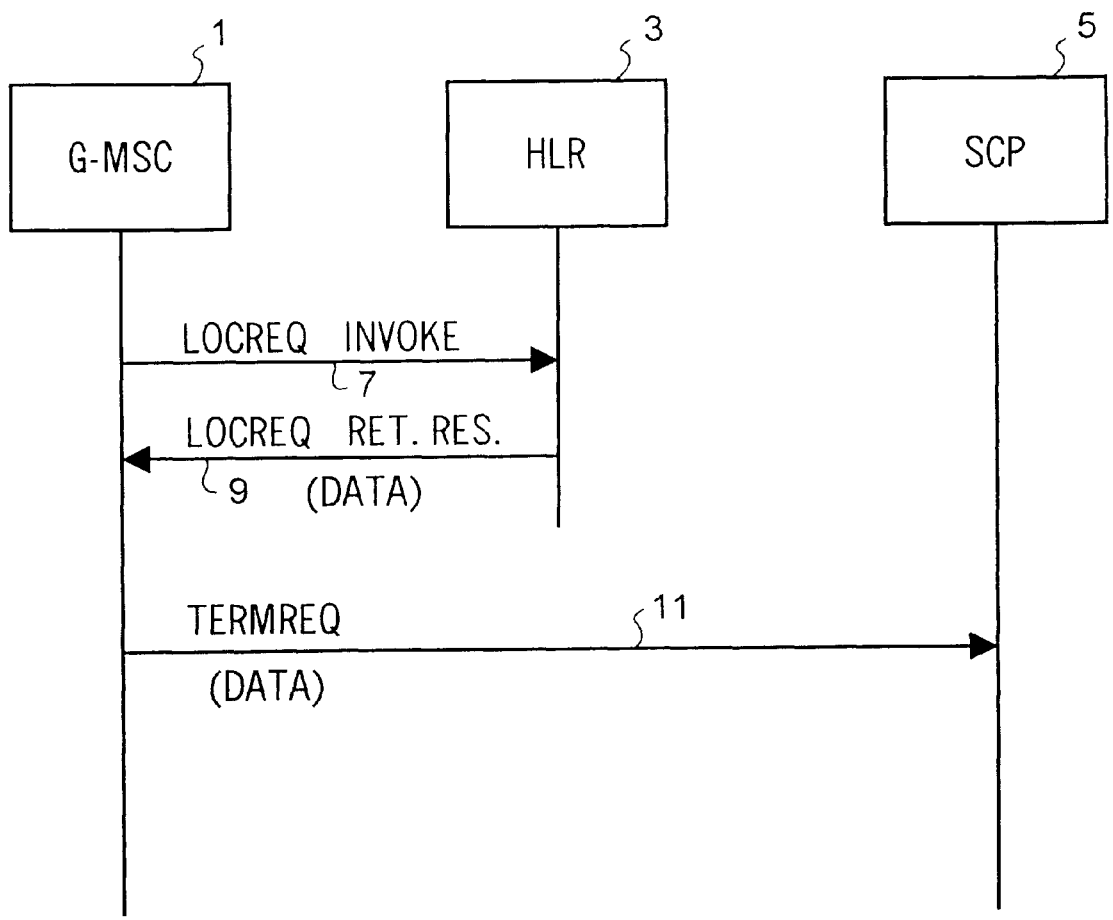
FIG. 1 (Prior Art) is a signaling diagram illustrating the flow of messages for conveying subscriber information using a Gateway Mobile Switching Center (G-MSC), a Home Location Register (HLR), and a Service Control Point (SCP) in an existing radio telecommunications network.

FIG. 1 is a signaling diagram illustrating the flow of messages for conveying subscriber information using a Gateway Mobile Switching Center (G-MSC), a Home Location Register (HLR), and a Service Control Point (SCP) in an existing radio telecommunications network. With the introduction of Intelligent Network (IN) services for mobile subscribers, existing radio telecommunications networks must interface with the SCP, in order to support IN services. The SCP requires specific subscriber information found in the called subscriber's HLR to support these IN services. In existing network implementations, when the G-MSC 1 receives an incoming call for a subscriber which requires the execution of an IN service, the G-MSC 1 sends a Location Request (LOCREQ) Invoke message 7 to the HLR 3. The LOCREQ Invoke message 7 is modified from the existing standard LOCREQ Invoke message in IS-41 to include an indication that the G-MSC 1 is able to handle IN service requests. The HLR 3 responds to the LOCREQ Invoke message 7 with a LOCREQ Return Result message 9 sent to the G-MSC 1. The LOCREQ Return Result message 9 is modified from the existing standard LOCREQ Return Result message in IS-41 to include subscriber information required by the SCP 5 to execute the IN service. Subsequently, the G-MSC 1 sends a TERMREQ message 11 to the SCP 5 and includes the subscriber information needed by the SCP 5 to support the IN service. Therefore, in order for the subscriber information to be transferred to the SCP 5, the G-MSC 1 must request the subscriber information from the HLR 3. The HLR 3 passes the subscriber information to the G-MSC 1, which in turn, passes the subscriber information to the SCP 5.

In order to convey the subscriber information in the existing system, several messages must be modified or added. The LOCREQ Invoke message 7 and the LOCREQ Return Result message 9 must be modified to identify the requested IN service and to carry the subscriber information, respectively. The TERMREQ message 11 is modified to convey the subscriber information from the G-MSC 1 to the SCP 5. Additionally, all three nodes (G-MSC 1, HLR 3, and SCP 5) must be modified to send and receive these modified messages.

Figure 2:
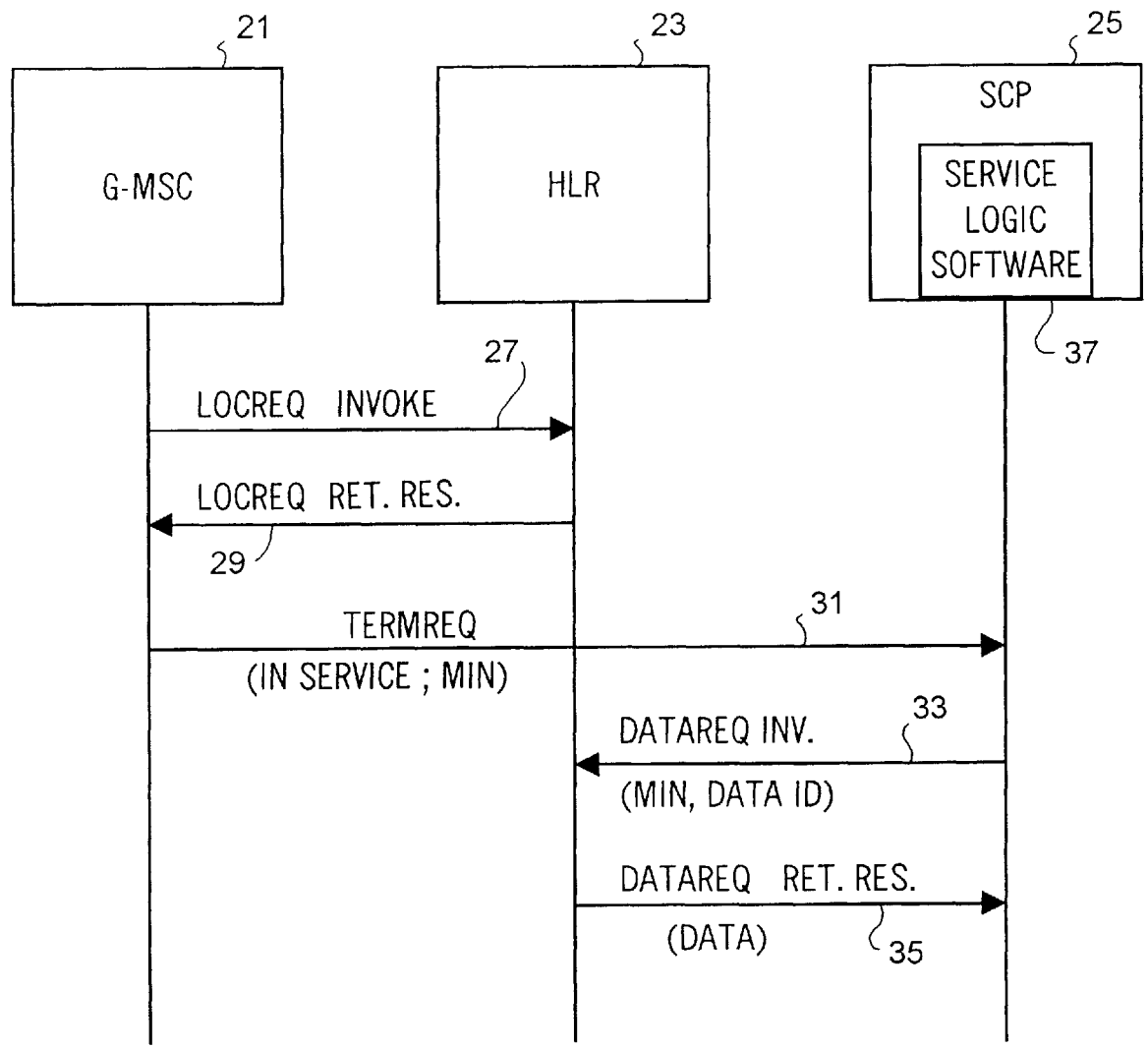
FIG. 2 is a signaling diagram illustrating the flow of messages for conveying subscriber information from an HLR to a SCP according to the teachings of the present invention.

FIG. 2 is a signaling diagram illustrating the flow of messages for conveying subscriber information from an HLR 23 to a SCP 25 in accordance with the teachings of the present invention. When the G-MSC 21 receives an incoming call that requires an IN service, the G-MSC 21 sends a LOCREQ Invoke message 27 to the HLR 23 requesting the location of the called subscriber and indicating that the G-MSC 21 is able to handle IN service requests. The HLR 23, based on the subscriber profile information, recognizes the subscriber as having IN services. The HLR 23, thereafter, responds by sending a LOCREQ return result message 29 to the G-MSC 21 with the Mobile Identification Number (MIN) and an additional indicator that the subscriber has the requested IN service. The LOCRBQ return result message 29 may optionally contain the subscriber location and the Temporary Location Directory Number (TLDN). Both the LOCREQ message 27 and the LOCREQ Return Result message 29 are standard IS-41 messages and, since they are carrying no additional data, require no modification. The G-MSC 21 then sends a TERMREQ message 31 to the SCP 25. The TERMREQ message 31 is also standard and carries no additional data. The TERMREQ message 31 informs the SCP 25 of the IN services requested and the MIN of the called mobile station. Within the SCP 25, service logic software 37 identifies the required subscriber information stored in the HLR 23 required to execute the requested IN service. Next, the SCP 25 sends a Data Request (DATAREQ) Invoke message 33 to the HLR 23 to query the HLR 23 for subscriber information. The DATAREQ Invoke message 33 contains the MIN of the called mobile station and a data identifier for the specific type of data requested from the HLR 23. The HLR 23 responds by sending the requested subscriber information in a DATAREQ Return Result message 35 directly to the SCP 25.

In the present invention, the impact on the telecommunications network is much less than with the existing implementation of FIG. 1. The DATAREQ Invoke message 33 and the DATAREQ Return Result message 35 are a generic message pair sent between the SCP 25 and the HLR 23. The data identifier in the DATAREQ Invoke message 33 is used in IS-41 today. The present invention also allows for adding future IN services while still minimizing the impact on the radio telecommunications network. When new data is needed because of additional new services, it is simply required to change the SCP service logic software 37. The DATAREQ Invoke message 33 and the DATAREQ Return Result message 35 require no modification when adding new IN services to the telecommunications network.

Figure 3:
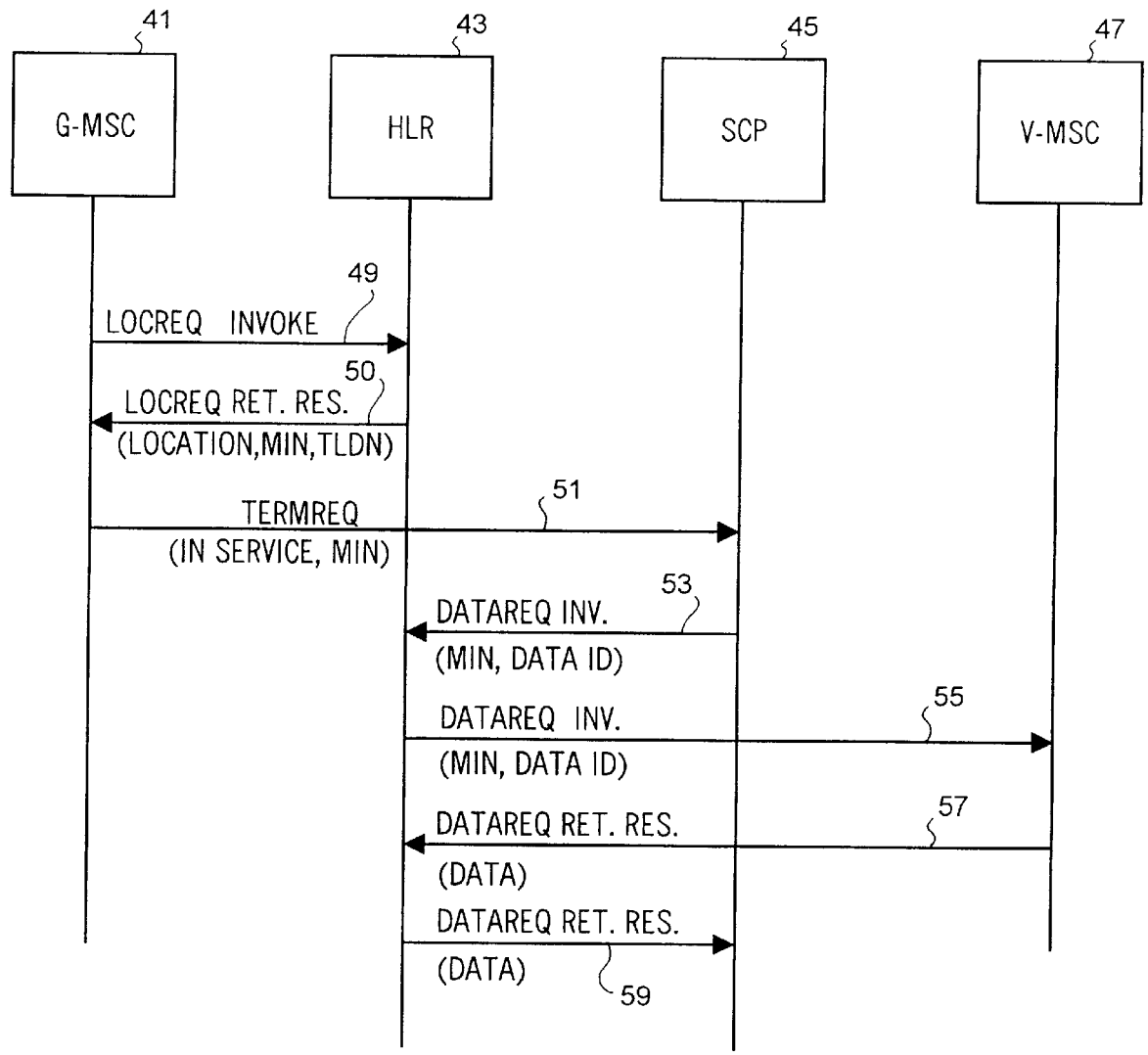
FIG. 3 is a signaling diagram illustrating the flow of messages for conveying subscriber information to a SCP in which the HLR obtains information from a Visited Mobile Switching Center (V-MSC) in accordance with the teachings of the present invention.

FIG. 3 is a signaling diagram illustrating the flow of messages for conveying subscriber information to a SCP in which the HLR obtains information from a Visited Mobile Switching Center (V-MSC) in accordance with the teachings of the present invention. For some IN services, the SCP may request information which is not stored in the HLR, but is available in a Visited Mobile Switching Center (V-MSC) where the called mobile station is operating. In this situation, the HLR must obtain the information from the V-MSC and forward it to the SCP. Following the receipt of an incoming call requiring an IN service, the G-MSC 41 sends a LOCREQ Invoke message 49 to a HLR 43 requesting the location of the called subscriber and also indicating that the G-MSC 41 is able to handle IN service requests. The HLR 43, based on the subscriber profile information, recognizes that the subscriber has IN services and responds by sending a LOCREQ return result message 50 to the G-MSC 41 with the MIN and an additional indicator that the subscriber has the requested IN service. The LOCREQ return result message 50 may also optionally contain the subscriber location and the LDN. The G-MSC 41 sends a TERMREQ Invoke message 51 to the SCP 45 with the requested IN service and MIN of the called subscriber. Next, the SCP 45 sends a Data Request (DATAREQ) Invoke message 53 to the HLR 43. The DATAREQ Invoke message 53 contains the MIN of the called subscriber and a data identifier for the specific type of data requested from the HLR 43. If the HLR 43 does not have the requested subscriber information, the HLR 43 determines the location of the subscriber, specifically the V-MSC 47 the subscriber is using. The HLR 43 then sends a DATAREQ Invoke message 55 containing the data identifier and MIN to the V-MSC 47 where the mobile station is operating. The V-MSC 47 sends a DATAREQ Return Result message 57 containing the requested subscriber information to the HLR 43. The HLR 43 then conveys the specified subscriber information to the SCP 45 in a DATAREQ Return Result message 59.

Figure 4:
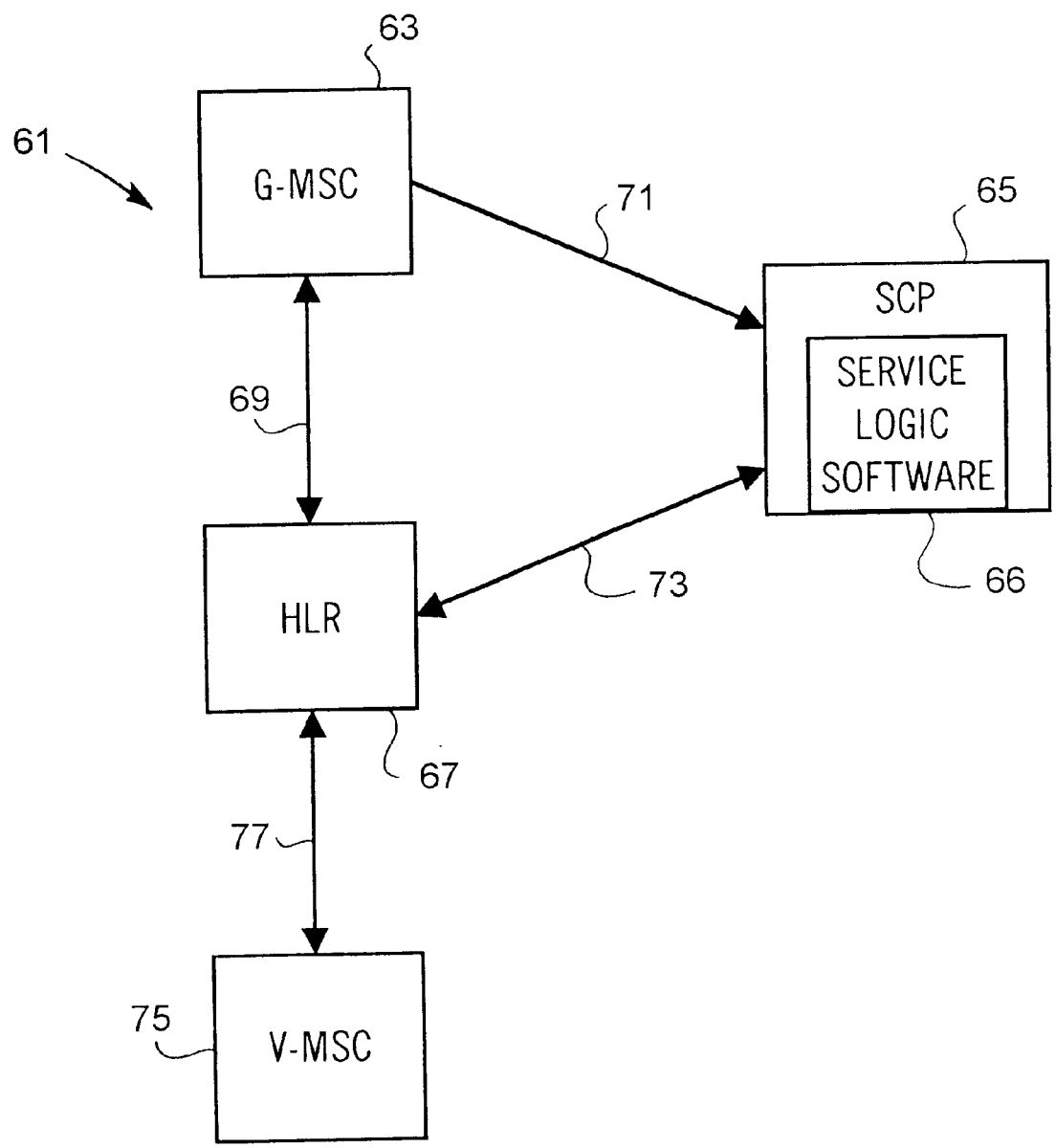
FIG. 4 is a simplified block diagram illustrating the components of a radio telecommunication system providing IN services through an SCP and a HLR of the present invention.

FIG. 4 is a simplified block diagram illustrating the components of a radio telecommunication system providing IN services through a SCP and a HLR of the present invention. In the preferred embodiment of the present invention, a radio telecommunication system 61 includes a G-MSC 63, a HLR 67, a SCP 65, a V-MSC 75, a communications link 71, a communications link 73, a communications link 69, and a communications link 77.

The G-MSC 63 is a switching center providing all the necessary switching functions in the radio telecommunication system 61 as well as a gateway to other telecommunication systems such as the Public Switched Telephone Network (PSTN). The G-MSC 63 is capable of communicating with the various nodes found in the radio telecommunication system 61.

The HLR 67 is a database used for the management of the mobile subscribers using the radio telecommunication system 61. The information found in the HLR 67 includes subscriber information, e.g. subscriber profile, as well as the location and identity of the subscriber.

The SCP 65 is a node in which service logic software is used to support the IN services for use in the radio telecommunication system 61. In the present invention, the SCP 65 communicates directly with the HLR 67 to obtain subscriber information. The SCP 65 includes a service logic software 66 which identifies the required subscriber information stored in the HLR 67 required to implement the requested IN service.

The G-MSC 63 queries the HLR 67 through the communications link 69 to ascertain the location of a called subscriber. Additionally, communications link 69 provides the conduit by which the HLR 67 responds to the location query from the G-MSC 63. The location query messages do not involve any modification from the standard messages found in existing radio telecommunication systems. The G-MSC 63 informs the SCP 65 of the called subscriber's MIN and requested IN service through a message via communications link 71. Subsequently, the SCP 65 requests the required subscriber information from the HLR 67 using communications link 73. If the HLR has the requested information, the HLR 67 responds by sending a message to the SCP 65 containing the subscriber information using communications link 73. If the HLR 67 does not have the requested subscriber information, and it is known that the subscriber is operating in V-MSC 75, the HLR 67 requests the subscriber information from the V-MSC 75 via communications link 77. If the information is available in the V-MSC 75, the V-MSC 75 responds by sending the subscriber information to the HLR 67 by the communications link 77. In turn, the HLR 67 sends the subscriber information to the SCP 65 via communications link 73 for execution of the requested IN service.

Figure 5A:
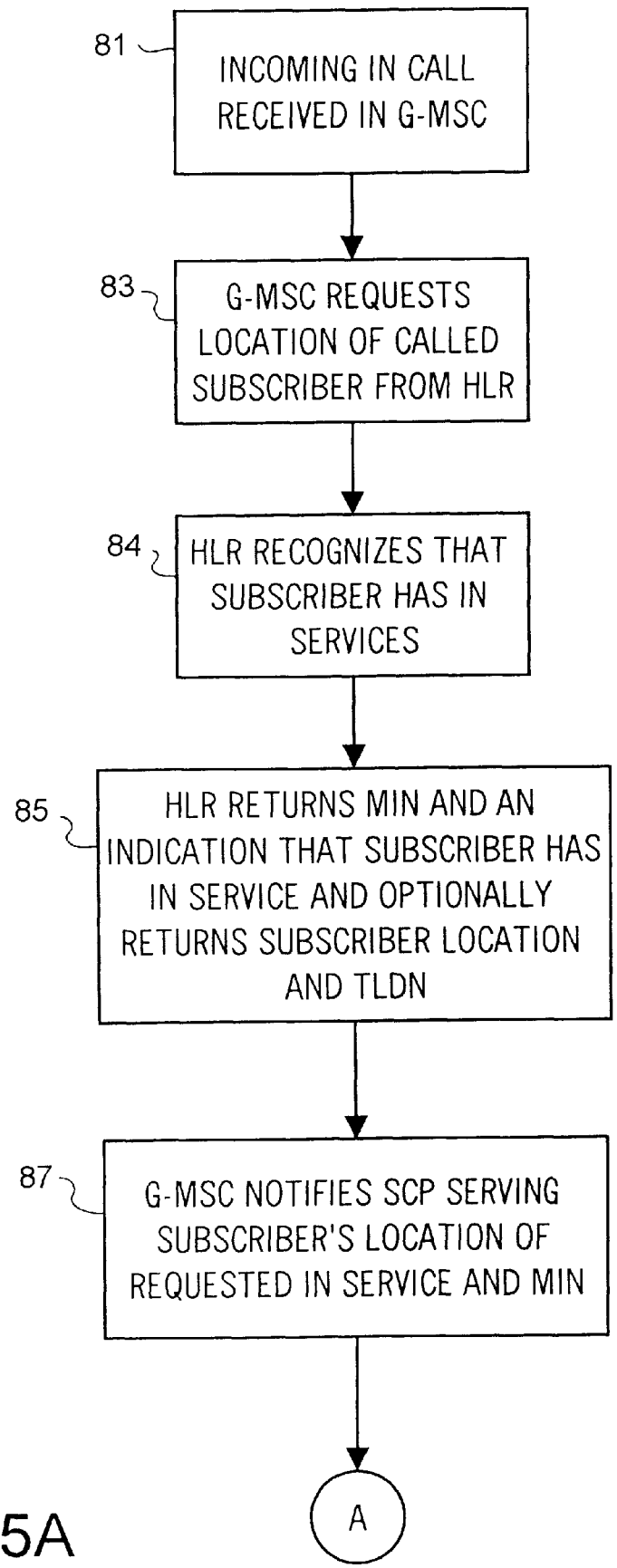
FIGS. 5A, 5B, and 5C are flow charts outlining the steps for conveying subscriber information to a SCP according to the teachings of the present invention.
Figure 5B:
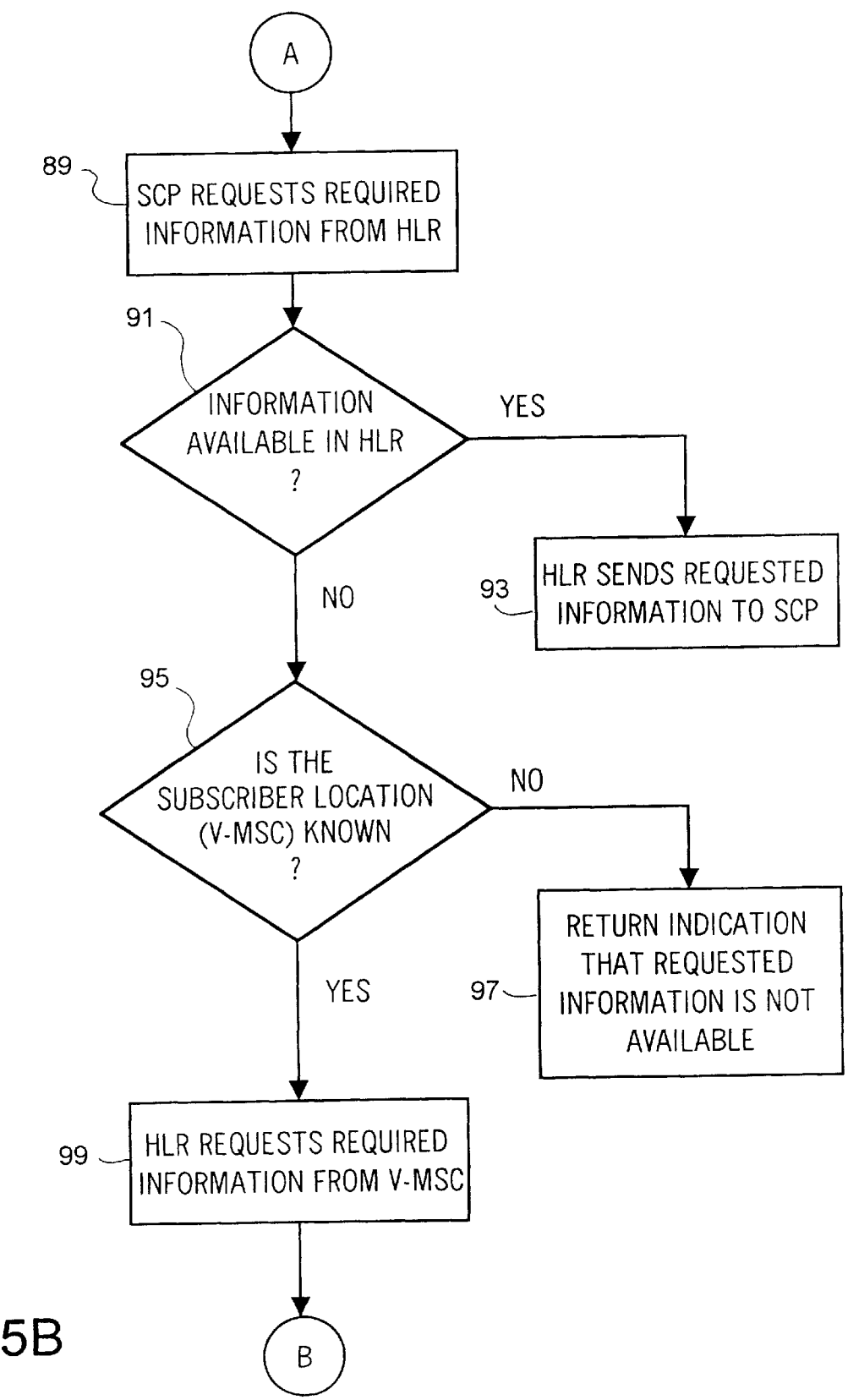
Figure 5C:
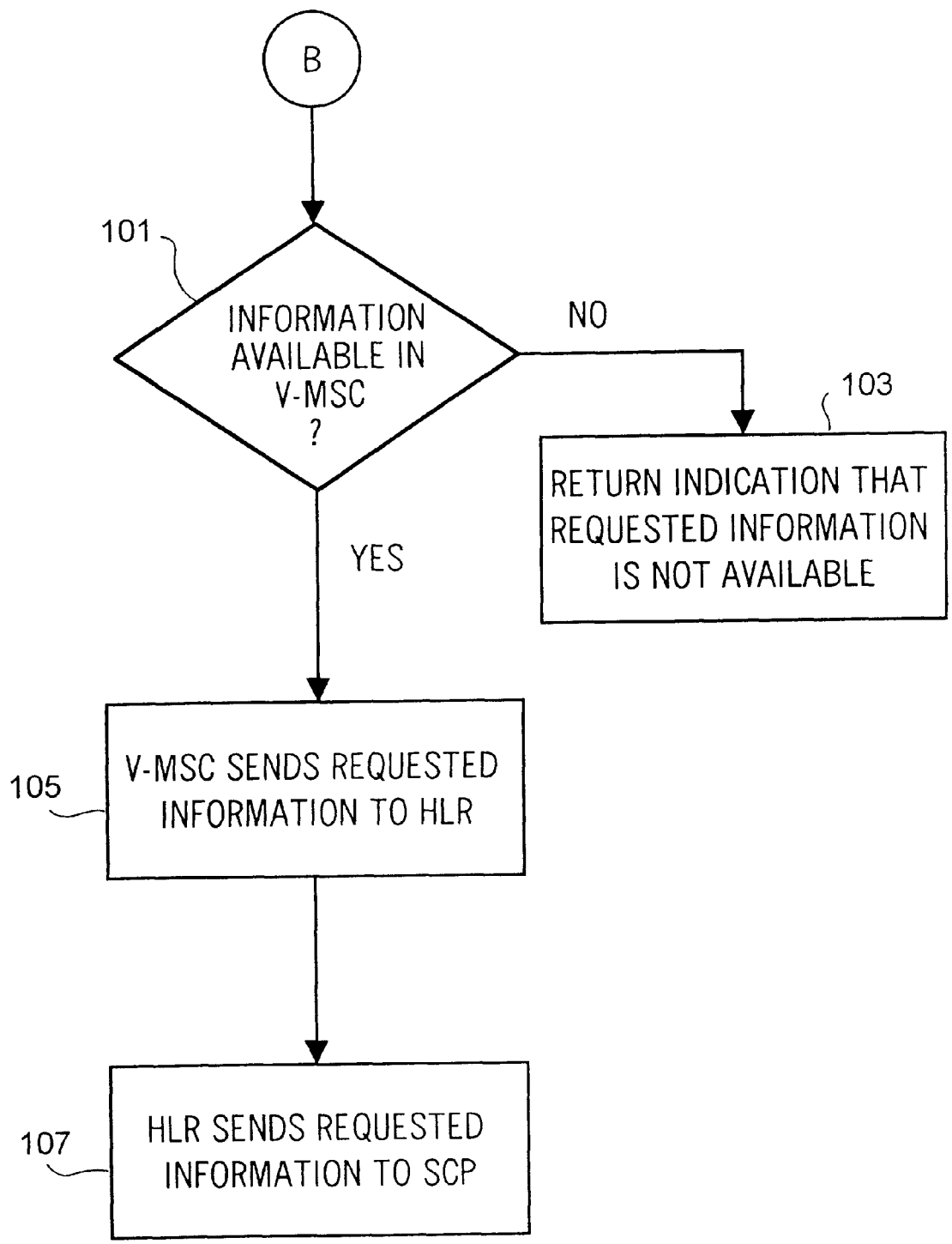

FIGS. 5A, 5B, and 5C are flow charts outlining the steps for conveying subscriber information to a SCP according to the teachings of the present invention. With reference to FIGS. 4, 5A, 5B, and 5C the steps of the method will now be described. Beginning with step 81, an incoming call requesting an IN service to a called subscriber is received in the G-MSC 63. Next, in step 83 the G-MSC 63 requests a location of the called subscriber from the HLR 67. In step 84, the HLR 67 recognizes that the subscriber has IN services. In step 85, the HLR 67 returns the MIN and an indication that the subscriber has the requested IN service to the G-MSC 63. Additionally, the HLR 67 may optionally send the subscriber location and the TLDN to the G-MSC 63. Then in step 87, the G-MSC 63 notifies the SCP 65 serving the subscriber's location of the requested IN service. In step 89, the SCP 65 requests the subscriber information required for implementing the requested IN service from the HLR 67.

In step 91, it is determined whether or not the requested subscriber information is available in the HLR 67. If the required information is available in the HLR 67, then the method moves to step 93 where the HLR 67 sends the requested information to the SCP 65. If, however, the required information is not available in the HLR 67, the method moves from step 91 to step 95 where it is determined whether or not the subscriber location is known, specifically, is it known in which V-MSC the subscriber is operating. If the subscriber location is not available in the HLR 67, the method moves to step 97 where the HLR 67 returns an indication that the requested information is not available to the SCP 65. If, however, the subscriber location is known in the HLR 67, the method moves from step 95 to step 99 where the HLR 67 requests the required information from the V-MSC 75.

Proceeding to step 101, it is determined whether or not the subscriber information is available in the V-MSC 75. If the required information is not available in the V-MSC 75, the method moves to step 103 where the V-MSC 75 returns an indication that the requested information is not available to the HLR 67. If, however, the required information is available in the V-MSC 75, the method moves from step 101 to step 105. In step 105, the V-MSC 75 sends the requested information to the HLR 67. In step 107, the HLR 67 sends the requested infonnation to the SCP 65.

It is thus believed that the operation and construction of the present invention will be apparent from the foregoing description. While the method and system shown and described have been characterized as being preferred, it will be readily apparent that various changes and modifications could be made therein without departing from the spirit and scope of the invention as defined in the following claims.

What is claimed is:

1. In a radio telecommunication system having a gateway mobile switching center (G-MSC), a home location register (HLR), and a service control point (SCP), a method of conveying required information about a subscriber to said SCP for implementing a requested intelligent network (IN) service in a radio telecommunications network, said method comprising the steps of:

sending a first signaling message requesting a location of said subscriber from said G-MSC to said HLR;

recognizing that said subscriber has said IN service by said HLR;

communicating an indication that said subscriber has said IN service from said HLR to said G-MSC;

sending a second signaling message from said G-MSC to said SCP informing said SCP of said requested IN service;

transmitting a data request message from said SCP to said HLR requesting said required subscriber information; and sending a data message from said HLR to said SCP containing said required subscriber information.

2. The method of claim 1 wherein said step of sending a first signaling message includes sending a first unmodified industry standard message requesting said location of said subscriber.

3. The method of claim 2 wherein said step of sending a second signaling message includes sending a second unmodified industry standard message containing said location of said subscriber.

4. The method of claim 3 wherein said step of communicating an indication that said subscriber has said IN service includes communicating said location of said subscriber.

5. The method of claim 1 wherein said step of transmitting a data request message includes transmitting a generic signaling message having a data identifier.

6. In a radio telecommunication system having a gateway mobile switching center (G-MSC), a home location register (HLR), a visited mobile switching center (V-MSC), and a service control point (SCP), a method of conveying required information about a subscriber to said SCP for implementing a requested intelligent network (IN) service in a radio telecommunications network, said method comprising the steps of:

sending a first signaling message requesting a location of said subscriber from said G-MSC to said HLR;

recognizing that said subscriber has said IN service by said HLR;

communicating an indication that said subscriber has said IN service from said HLR to said G-MSC;

sending a second signaling message from said G-MSC to said SCP informing said SCP of said requested IN service;

sending a first data request message from said SCP to said HLR requesting said required subscriber information;

determining whether said requested subscriber information is available in said HLR;

determining whether said subscribers location is known, upon determining that said requested subscriber information is not available in said HLR;

sending a second data request message from said HLR to said V-MSC requesting said required subscriber information, upon determining that said subscriber's location is known;

determining whether said requested subscriber information is available in said V-MSC;

sending a first data message from said V-MSC to said HLR containing said required subscriber information; and sending a second data message from said HLR to said SCP containing said required subscriber information.

7. The method of claim 6 wherein said step of sending a first signaling message includes sending a first unmodified industry standard message requesting said location of said subscriber.

8. The method of claim 7 wherein said step of sending a second signaling message includes sending a second unmodified industry standard message containing said location of said subscriber.

9. The method of claim 8 wherein said step of communicating an indication that said subscriber has said IN service includes communicating said location of said subscriber.

10. The method of claim 6 wherein said steps of sending a first data request message from the SCP to the HLR, and sending a second data request message from the HLR to the V-MSC include sending a generic signaling message having a data identifier.

11. A radio telecommunication system that obtains and utilizes subscriber information stored in a home location register (HLR) to implement a requested intelligent network (IN) service, said system comprising:

a gateway mobile switching center (G-MSC) for receiving an incoming call for a subscriber, said incoming call requesting said IN service;

a service control point (SCP) for implementing said requested IN service in said radio telecommunication system, said SCP including means for identifying subscriber information stored in said HLR required to implement said requested IN service;

means for notifying said SCP of the requested IN service;

means for sending a request for said required subscriber information from said SCP to said HLR; and means for sending said requested required subscriber information from said HLR to said SCP in response to a request from said SCP.

12. The radio telecommunication system of claim 11 wherein said means for notifying said SCP of the requested IN service is an unmodified TERMREQ signaling message sent from said G-MSC.

13. The radio telecommunication system of claim 12 wherein said means for sending a request for said required subscriber information is a data request message.

14. The radio telecommunication system of claim 11 wherein said means for sending said requested required subscriber information is a data message containing said requested required subscriber information.

15. The radio telecommunication system of claim 11 further comprising:

a V-MSC having said subscriber information;

a means for sending a request for said required subscriber information from said HLR to said V-MSC; and a means for sending said requested required subscriber information from said V-MSC to said HLR.

16. The radio telecommunication system of claim 15 wherein said means for sending a request for said required subscriber information from said HLR to said V-MSC is a second data request message.

17. The radio telecommunication system of claim 16 wherein said means for sending said requested required subscriber information from said V-MSC to said HLR is a first data message containing said requested required subscriber information.

* * * * *